Nov. 10, 1959 A. E. NESSLER ET AL 2,911,719
CHEESEMAKING APPARATUS
Original Filed May 10, 1954 5 Sheets-Sheet 1

Inventors.
Joseph G. Hartman.
Aldo E. Nessler.
By Soans, Anderson, Luedeka & Fitch
Attorneys.

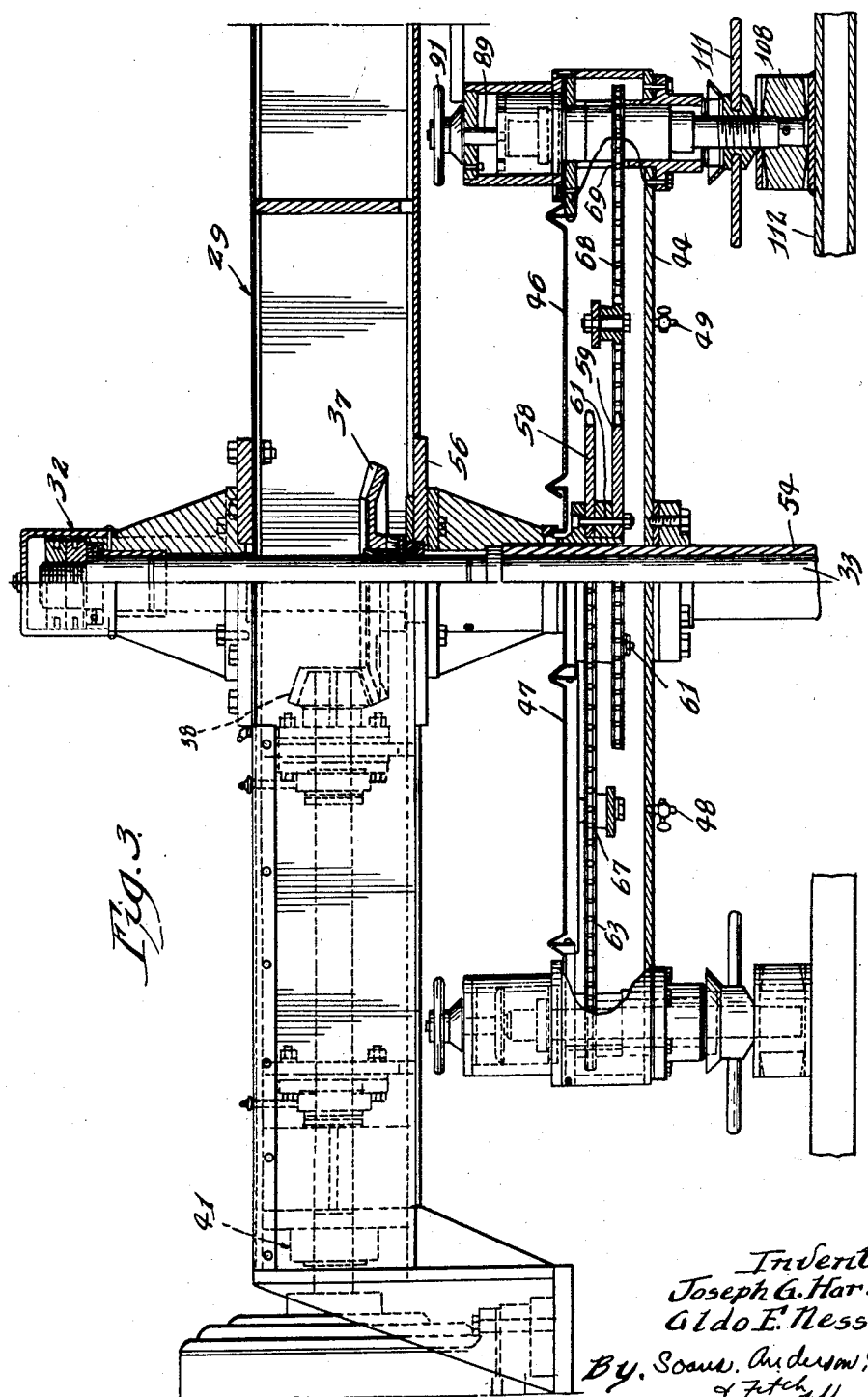

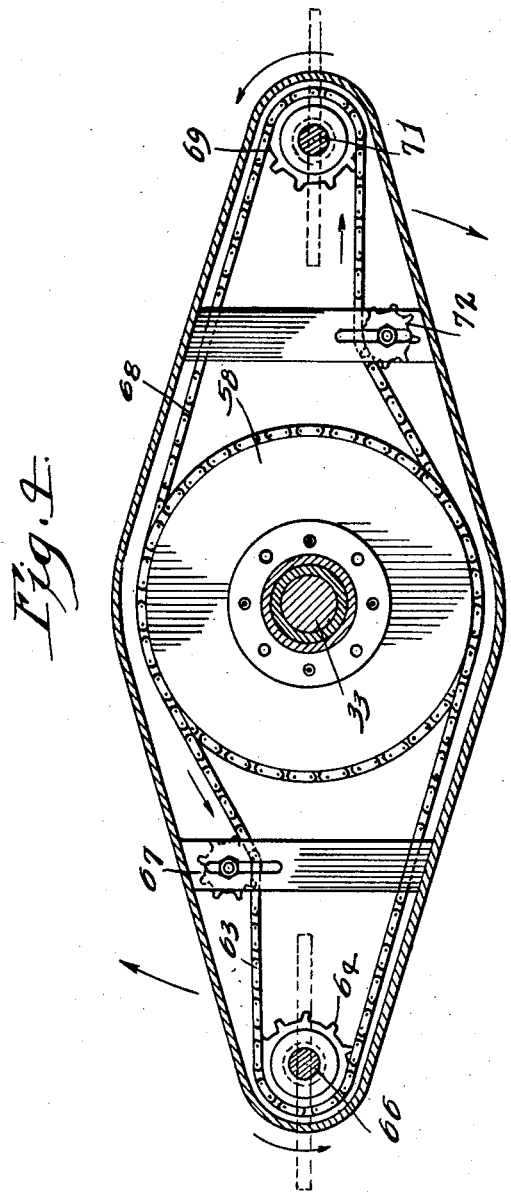

Nov. 10, 1959 A. E. NESSLER ET AL 2,911,719
CHEESEMAKING APPARATUS
Original Filed May 10, 1954 5 Sheets-Sheet 4
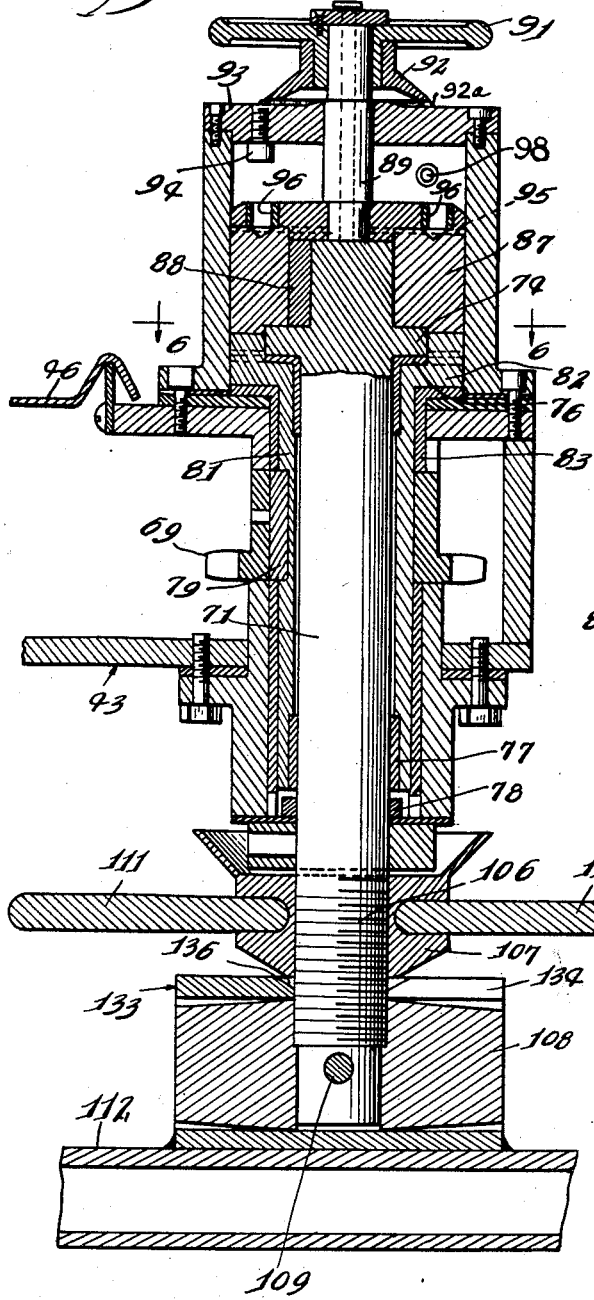
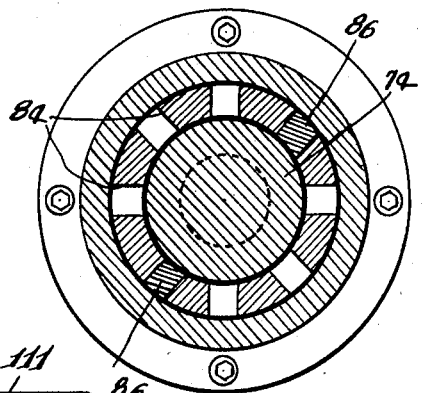
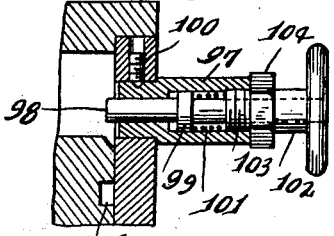
Inventors.
Joseph G. Hartman,
Aldo E. Nessler.
By Soans, Anderson, Luedeka & Fitch
Attorneys.

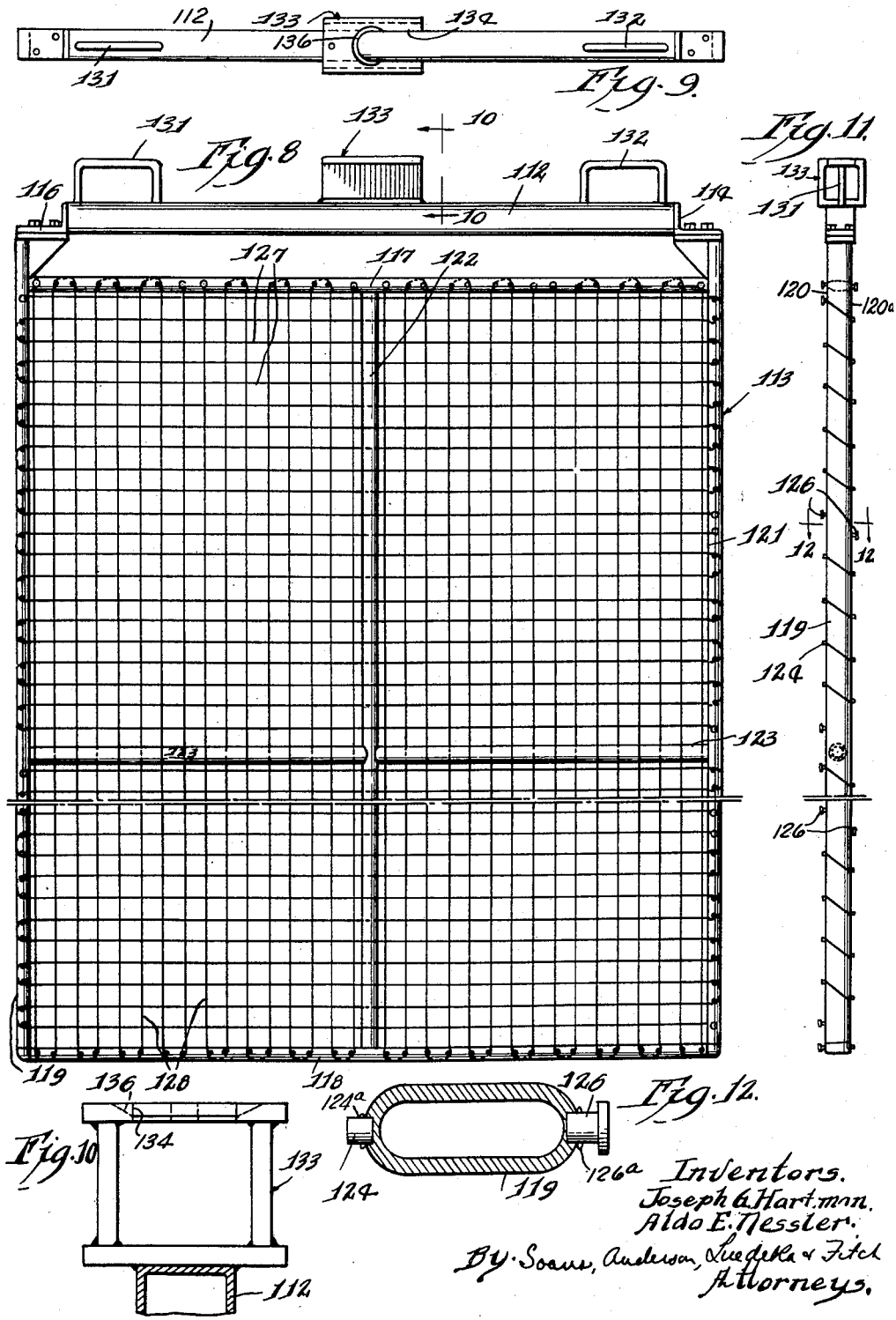

United States Patent Office 2,911,719
Patented Nov. 10, 1959

2,911,719

CHEESEMAKING APPARATUS

Aldo E. Nessler, Evanston, and Joseph G. Hartman, Wilmette, Ill., assignors to National Dairy Products Corporation, New York, N.Y., a corporation of Delaware Original application May 10, 1954, Serial No. 428,731, now Patent No. 2,814,114, dated November 26, 1957. Divided and this application July 31, 1957, Serial No. 675,299

2 Claims. (Cl. 31—22)

The present invention is directed to improved cheesemaking apparatus which includes a highly efficient mechanical agitating system and improved curd cutting and working apparatus.

This application is a division of our prior application, Serial No. 428,731, filed on May 10th, 1954, now Patent 2,814,114, and assigned to the assignee of this invention.

In the production of cheese in a cheese factory, the "make procedure" usually takes place in a large horizontally disposed vat which holds from one thousand to ten or more thousand pounds of milk. Usually, the tanks are rectangular and agitation in the vat is accomplished by mechanical agitators which travel up and down the length of the vat on a track which is suspended over the vat. The rectangular vat is used quite extensively despite the obvious difficulty that the curd is not uniformly agitated during the make procedure due to the fact that the traveling mechanical agitators are only in one given section of the vat for only a short period of time, and the elongated shape of the vat is such that the agitating action is more or less localized. Also, heating of the curd is not efficiently carried out because there is an extremely large surface area of curd and whey exposed to the room air. Furthermore, it is difficult to clean a vat having the square corners which are inherent in a rectangular vat construction.

Some use has been made of cylindrical tanks having a vertically disposed axis for cheesemaking because this shape makes possible more uniform heating and agitation, but these cylindrical tanks have not been extensively used because of the difficulties involved in cutting the set curd into pieces of the desired size with the regular manual curd cutting equipment since this manual equipment requires that every portion of the vat is within reach of the cheesemaker.

Some attempts have been made to provide mechanical cheese cutting equipment but mechanical operation during the cutting stage has been generally unsatisfactory because the particles of curd are not uniform in size.

One of the principal objects of the present invention is to provide an improved cheesemaking apparatus having mechanical means therein for agitating the milk and the curd as well as for cutting the curd efficiently into pieces of the desired size. Another object of the present invention is to provide an improved cheesemaking assembly provided with means for quickly and conveniently changing the apparatus from a milk agitating assembly to a curd agitating and cutting assembly and so on, through the cheesemaking process.

A further object of the present invention is to provide an improved cylindrical cheesemaking vat with efficient curd cutting means.

A still further object of the invention is to provide improved cheese harp or curd knife assemblies for cutting and working cheese curd.

A further description of the present invention will be made in conjunction with a description of the attached sheets of drawings which illustrate the principles of the present invention as applied to one preferred embodiment of cheesemaking apparatus.

In the drawings:

Figure 3 is an enlarged fragmentary view in elevation and partially in cross-section illustrating the drive mechanism for the apparatus;

Figure 4 is an enlarged schematic view of the chain and sprocket assembly employed to drive portions of the apparatus;

Figure 5 is an enlarged view in elevation and partly in cross-section, illustrating the construction of a portion of the cheesemaking apparatus which drives the various agitating and cutting mechanisms;

Figure 6 is a view taken generally along the line 6—6 of Figure 5;

Figure 7 is a fragmentary view of the detent mechanism employed in the apparatus;

Figure 8 is an enlarged view in elevation of a beater harp structure which embodies the improved cheese harp construction;

Figure 9 is a plan view of the beater harp assembly of Figure 8;

Figure 10 is an enlarged view taken generally along the line 10—10 of Figure 8;

Figure 11 is an end elevational view of the assembly shown in Figure 8; and

Figure 12 is an enlarged sectional view taken generally along the line 12—12 of Figure 11.

Figure 1:
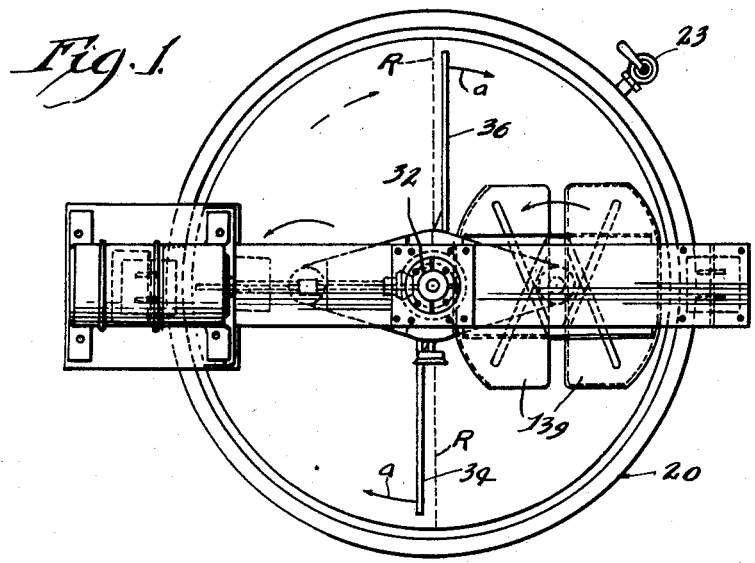
Figure 1 is a plan view of the apparatus.
Figure 2:
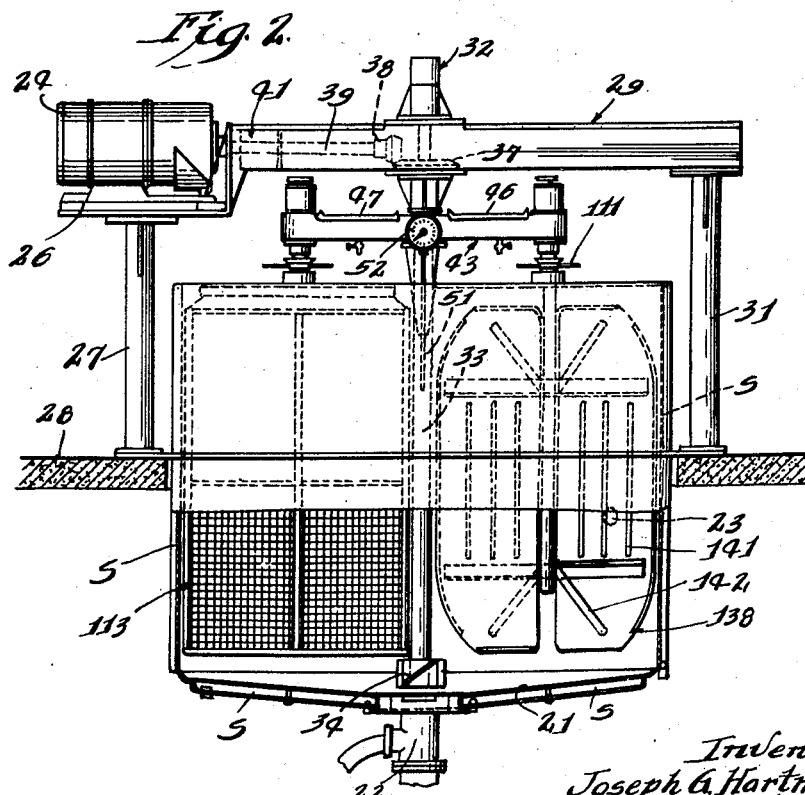
Figure 2 is a view in elevation of the apparatus shown in Figure 1 with portions thereof being broken away.

Referring to Figures 1 and 2, it will be seen that the cheesemaking assembly illustrated includes a substantially cylindrical tank 20 provided with a sloping base wall 21 which provides for drainage of curd and whey to the center of the tank 20 from whence it can be discharged by means of a valve 22 located at the center of the tank 20.

Located centrally of the tank 20 is another discharge valve 23 through which supernatant whey may be discharged from the tank 20.

The drive means for the entire assembly may consist of a motor 24 mounted on a base 26 which is supported on a support leg 27 resting on a support surface 28. The motor base 26 is connected to a bridge assembly generally indicated at 29, the latter being supported in its elevated position by another support leg 31.

The bridge member 29 may consist of structural steel sections suitably fastened together. Centrally of the bridge member 29 there is a bearing member 32 which supports a centrally disposed shaft 33 for rotation within the tank 20. At its lower end, the shaft 33 carries a pair of outwardly extending scraper blades 34 and 36 which ride as best illustrated in Figures 1 and 2.

The scraper blades 34 and 36 are preferably located in such manner as to facilitate discharge of curd and whey from the vat and to set up forces which tend to cause any dense foreign objects to move toward the outer walls of the vat. This can be accomplished by supporting the scraper blade in such manner that it is not radially extending but so that instead, it sweeps the bottom of the vat with the outer end lagging behind the inner end of the blade. In the illustrated structure, this is accomplished by arranging the blades 34 and 36 parallel to a radius of the vat (indicated as R in Figure 1) and spaced forwardly of the radius in the direction of movement of the blades indicated by the arrows (a) in Figure 1. This arrangement causes dense objects to move toward the periphery of the vat incident to the movement of the blades through the whey and, in addition, causes the curd and whey to drain substantially simultaneously from the vat so that it is unnecessary to shovel curd from the vat at the end of the operation. Such an arrangement is highly desirable as it results in a saving of labor and in keeping foreign objects which may accidentally fall into the vat, e.g., tools, etc. from being incorporated in the cheese.

Secured to the shaft 33 below the support bearing 32 is a bevel gear 37 (Figures 2 and 3). A pinion 38 meshes with the bevel gear 37, the pinion 38 being secured to a drive shaft 39 which is powered by the motor 24. Interposed between the motor 24 and the pinion 38 is an overrunning clutch assembly generally indicated at numeral 41 in the drawings. Overrunning clutch mechanisms are, per se, well known for various uses and will not be described in detail in this specification. The function of the clutch 41 will become apparent in a subsequent portion of the specification.

Also secured to the centrally disposed shaft 33 and rotatable therewith is a sub-frame assembly generally indicated at numeral 43 in the drawings. The sub-frame 43, as illustrated best in Figure 3, may consist of an open topped pan 44 which is constructed to support driving members and curd working attachments, as will be hereinafter described. The pan 44 provides, in effect, a pair of radially disposed arms about the shaft 33. The pan 44 is provided with removable covers 46 and 47, permitting access to the interior of the pan. A pair of drain cocks 48 and 49 may be provided in the pan 44 to drain off any accumulated liquid. The sub-frame 43 may also carry a temperature measuring device 51 having a scale 52 from which the temperature reading inside the tank may be taken.

The assembly described thus far provides a rotary central shaft with a sub-frame assembly suitable for receiving implements such as agitating means, cutting means, and the like during different stages in the manufacture of the cheese. The present invention provides the further improvement of providing means for selectively rotating the implements carried by the sub-frame 43 in a planetary fashion about the centrally disposed shaft 33. This additional rotational movement of the implements about their own axes while the sub-frame 43 itself is rotating about the centrally disposed shaft 33 provides a very high mixing efficiency, with the result that the curd produced is of substantially uniform texture and consistency.

In the assembly shown in the drawings, the rotation of the implements carried by the sub-frame 43 is powered by the rotation of the central shaft 33. As best seen in Fig. 3, the shaft 33 is received within a bearing member 54. The bearing 54 is received within a flanged support member 56 secured to the bridge member 29. The support member 56, as illustrated in Figure 3, carries a pair of stationary sprockets 58 and 59, the sprockets being secured to the support member 56 by means of bolts 61. As best illustrated in Figure 4, the sprocket 58 has a chain 63 trained about its periphery and arranged to drive a sprocket 64 secured to a shaft 66. A movable tensioning sprocket 67 is also provided to adjust the tension on the chain 63 as desired.

Similarly, the sprocket 59 is provided with a chain 68 which is arranged to drive a sprocket 69 located on a shaft 71. A tensioning sprocket 72 is also included to adjust the tension on the chain 68.

As previously brought out, during the cheesemaking operation, it is desirable to provide means for efficient agitation and cutting of the curd, and, in the case of Swiss cheese, for beating of the curd after its formation. To accomplish all of these functions, the assembly of the present invention provides for a readily interchangeable set of implements which are arranged to be engaged at opposite ends of the rotatable sub-frame assembly. Means are also provided to rotate these implements about their own axes while the sub-frame itself is rotating about the central axis of the vat. Means are also provided to lock the implements, for example, a cutting harp or curd knife, in a fixed radial position for the cutting operation.

The ends of the sub-frame 43 are provided with implement receiving mechanisms which receive the various implements such as the paddles, cutting harps, and beating harps, interchangeably. Inasmuch as both of these implement receiving means are identical, only one has been illustrated in the drawings in Figure 5.

As illustrated in Figure 5, the implement receiving means may include a centrally disposed shaft 71 having an enlarged annular portion 74 bottomed on a flange bearing 76. A second bearing 77 is provided centrally of the shaft 71 and a seal ring 78 is disposed immediately below the bearing 77 to prevent drainage of oil.

The sprocket 69 is connected by means of a key 79 to a sleeve 81 so that rotation of the sprocket 69 serves to rotate the sleeve 81. The sleeve 81 has an enlarged flange portion 82 disposed between the flange bearing 76 and a second flange bearing 83. A disengageable driving connection between the sleeve 81 and the shaft 71 is provided by means of a plurality of circumferentially spaced slots 84 (Figure 6) on the flange portion 82 which engage diametrically spaced teeth 86 formed on a collar 87. The collar 87, in turn, is keyed to the shaft 71 by means of a key 88. As long as the teeth 86 are engaged in a pair of slots 84, there will be a driving connection between the sprocket 69 and the central shaft 71. As long as the driving connection exists, the central shaft 71 will be rotated in response to movement of the central shaft 33 in the tank 20, thereby providing an additional rotational movement about its own axis.

In employing the cutter harps, however, it is desirably initially to lock the harp against rotation on its own axis. This is accomplished in the structure of the present invention by providing a sleeve 89 which is threaded into the collar 87 and rotates with it. The opposite end of the sleeve receives a hand wheel 91 mounted for rotation in a bearing 92. The bearing 92 is welded, as by weld 92a, or otherwise secured to a cover member 93 provided with a bolt 94 extending therethrough with the headed portion of the bolt 94 facing the collar 87. The top of the collar 87 is provided with a plurality of circumferentially spaced recesses 96 of sufficient diameter to accommodate the head of the bolt 94. Thus, upon raising the sleeve 89 and hence the collar 87, a slight turning of the hand wheel 91 will be effective to set the bolt 94 in one of the recesses 96 so as to lock the collar 87 against relative movement with respect to the cover member 93.

A detent mechanism is also provided for holding the collar 87 out of engagement with the sleeve 81. This mechanism is best illustrated in Figure 7 of the drawings. As shown in this drawing, the detent may include a sleeve 97 extending into the housing containing the implement receiving mechanism. A set screw 100 is provided to lock the sleeve 97 in position. Slidable within the sleeve 97 is a pin 98 having one end extending into the space between the cover member 93 and the collar 87 when the elements are in the position shown in Figure 5. The pin 98 has an annular collar 99 against which a coiled spring 101 is arranged to operate, forcing the pin 98 into engagement with a suitable slot or aperture 95 on the collar 87. The pin 98 may be retracted by movement of a hollow stud 102 having a threaded portion 103 received within a locking nut 104.

One end of the shaft 71 is provided with a threaded portion 106 which engages an internally threaded tapered collar 107. The collar 107 is provided with a pair of arms 111 by means of which the collar 107 is positioned in any desired position along the threaded portion 106 of the shaft 71. A wedge block 108 is secured to the extreme end of the shaft 71 by means of a pin 109, as illustrated in Figure 5.

One of the features of the present invention resides in providing a unique type of harp or curd knife structure which is capable of being readily cleaned and which can be strung in a number of patterns so as to make it possible to employ a single harp frame for a variety of purposes.

For example, the harp may be strung to make vertical cuts or horizontal cuts or to effect both cuts at the same time or it can be employed as a beater harp for use in the manufacture of Swiss cheese.

The structure as applied to a beater harp is best illustrated in Figures 8 through 12 of the drawings. It will be seen that the frame structure includes a channel member 112 secured to a peripheral frame structure 113 by means of a pair of end flanges 114 and 116. As shown in Figure 8 the frame structure 113 itself may include a top side member 117, a bottom side member 118, and left and right side members 119 and 121, respectively, which define a generally rectangular frame assembly having generally planar opposite faces 120 and 120a. The frame structure 113 may, if made in large sizes, also be provided with a vertical bracing member 122 and a horizontal bracing member 123 as illustrated.

The side members forming the outside boundaries of the harp structure, as shown in Figure 12, are preferably generally elliptical in cross section to facilitate cleaning and to minimize disturbance as the frame passes through the curd and whey mixture. The top and left side members 117 and 119, respectively, are each provided with a series of spaced guide pins or cylindrical projections 124, the pins 124 being welded, as by weld 124a, or soldered or otherwise secured to the frame members. As best seen in Figure 11, successive ones of the guide pins 124 are disposed on opposite faces 120 and 120a of the frame 113. Likewise, the bottom and right side members 118 and 121, respectively, are provided with a plurality of pins 125 which are similarly constructed and correspondingly disposed with respect to the guide pins 124 so that each guide pin 124 is provided with a corresponding pin 125 which is disposed on the same face of the frame 113. As best illustrated in Figures 11 and 12, the side members may also have a number of headed pins 126 spaced along the frame member and welded, as by weld 126a, or otherwise secured thereto, for the purpose of providing an anchor for the ends of horizontal and vertical cutting wires 127 and 128 strung across the harp with the corresponding pins 124 and 125 acting as guides. For example, as seen in Figures 8 and 11, the upper one of the horizontal wires 127 is suitably attached at its end to the headed pin 126 disposed near the top of the left side member 119. The wire 127 is then strung across the face 120 of the frame 113 to the upper side of a guide pin 124 disposed near the top of the right side member 121, around the outside of the side member 121 to the lower side of the next lower guide pin 124, and thence across the opposite face 120a of the frame to the upper side of the corresponding pin 125 on the left side member 119, after which the wire 127 is strung around the left side member 119 to the lower side of the next lower pin 125. As illustrated in Figure 8, the wire 127 is strung across the frame 113 a total of eleven times and then the wire 127 is anchored to a headed pin 126. The remaining wires 127 and 128 are likewise strung on the frame 113. The above described positioning and the construction of the pins makes it considerably easier to clean the harp after the cutting operation, since there is no opportunity for curd particles to become lodged in sockets, eyes, or other fastening means employed in other types of harp constructions.

The beater harp illustrated in Figure 8 includes horizontally extending wires 127 and vertically extending wires 128 of substantially equal spacing. With the harp structure shown, however, the disposition of the wires can be changed very readily, as for example, when the harp is to be used for different types of cheeses. It is common practice for the cheese industry to use a harp structure for Cheddar cheese which is different from that employed, for example, in the manufacture of Swiss cheese, and the harp structure described lends itself to a rapid changeover from one type of cheese to the other.

As best seen in Figures 9 and 10, the channel member 112 has a pair of lifting handles 131 and 132 welded to it at opposite ends. Centrally of the channel 112 there is provided a chuck 133 for receiving the shaft and block 108 of the drive assembly. The chuck 133, as illustrated in Figures 9 and 10, has a slot 134 in the upper portion thereof, which slot has a tapered seating surface 136 near the center of the chuck 133. This slot 134 enables the wedge block 108 (Figure 5) to be slipped into the chuck while the block 108 (Figure 5) is still screwed to the threaded portion 106 of the shaft 71. The shaft 71 is then locked in position by rotation of the arms 111 on the collar 107, causing the tapered base of the collar 107 to become seated in a tapered seating face 136 formed in the top of the chuck 133.

A similar securing means is employed to secure other implements such as the agitator 138 illustrated in Figures 1 and 2 of the drawings. As seen in these two figures, the agitator elements 138 may consist of a plurality of horizontally disposed paddle members 139, vertically disposed paddle members 141, and angularly disposed paddle members 142.

In a typical operation of the apparatus in making Swiss cheese, the milk was introduced into the tank 20 with a paddle and one harp disposed on the sub-frame 43. The harp consisted of the type of framework illustrated in Figure 8, except that it contained only vertically strung wires, the spacing between the wires being about ⅜ inch and it extended down to almost the bottom of the tank. Milk was added to the tank, during which time the contents of the vat were agitated. During this agitation period, the clutch mechanism illustrated in Figure 5 of the drawings was engaged so that both the harp and the paddle were rotated on their own axes jointly with their rotation about the shaft 33. At the same time, the milk was warmed to the proper degree, the heat being supplied through the steam jacket illustrated as S in Figure 2. When the vat was full, the usual starter culture was added and mixed into the milk with the agitator and at the proper time rennet was added and mixed for several minutes with the agitator paddle. The paddle was replaced by a second harp having wires strung in a horizontal direction only, the spacing between the wires also being ⅜ of an inch. The clutch mechanism 84—86 shown in Figure 6 was then disengaged and the two harps were locked in a fixed position along their axes of rotation through means of the bolt 94 and recess 96, seen in Figure 5. The curd was allowed to set for a period of about thirty minutes, at which time the curd had achieved the firmness desired by the cheesemaker.

With the harps locked in position, the curd was cut by energizing the motor 24. In cutting the curd, the shaft 71 was rotated until the curd started to move with the cutting harps as the inertia of the curd was overcome. At this point, the motor was de-energized and the overrunning clutch mechanism 41 was then operable to permit the cutting harps to rotate freely with the contents of the vat and maintaining them in the same relative position in the curd mass which they had occupied when the motor was de-energized. After the contents of the vat stopped moving, the motor was started again to complete the cutting. This multiple cutting operation, made possible by the overrunning clutch maintaining the harps in the curd at a substantially fixed position, effectively prevents double cutting of the curd which occurs when there is a non-slipping connection between the motor and the drive shaft.

After cutting of the crud into annuli, each of equal cross-section, the harps were unlocked, following a ten minute wait, and the clutch mechanism 84—86, shown in Figure 6, was again engaged. The motor was energized and the harps were rotated along their own axes as well as about the central axis of the vat to chop up the curd into more or less uniform pieces. During this cutting, more whey was expressed from the curd.

After the harping operation, some types of cheeses, notably Swiss, require a foreworking period prior to cooking. The apparatus of the present invention is particularly well suited to this type of operation because of the interchangeability of the implements on the drive shaft. For example, on foreworking curd in Swiss cheese manufacture, the two harps are replaced with a paddle and a beater harp. This assembly is illustrated in Figure 2 of the drawings. Rotation of the paddle and beater harp during the foreworking process was effective to reduce the size of the curd particles to very small dimensions, approximating that of a grain of wheat. In connection with Figure 2, it will be observed that the beater harp 113 does not extend to the base of the tank 20. The reason for this stems from the discovery that considerably better working of the curd is achieved if the scraper blades 34 and 36, instead of the beater harp wires are provided in the space adjacent the base of the tank 20. The combination of the beater harp and the scraper blades apparently provides a much more uniform product than could be achieved if the beater harp alone is employed.

The coaction between the scraper blades and the beater harp is as follows. As the curd settles onto the bottom of the vat and knits into a firm mass, it is raised from the vat bottom and suspended in whey by the action of the scraper blades, at which point it is broken up by the beater harp. This reduces the stress upon the beater harp and makes possible a more uniform dispersion of the curd particles.

The apparatus described in the foregoing makes possible the efficient handling of large volumes of milk, e.g., 25,000 pounds or more, with a minimum of manual effort. Furthermore, the use of the apparatus in actual commercial production of cheese has indicated that the cheese made in this type of vat is of as high or higher quality than cheese made in rectangular cheese vats and in the case of Swiss cheese the grades of the finished cheese average somewhat higher than cheese made in a rectangular vat. We believe that this is attributable at least in part to the very efficient agitation by the improved harp structures, to the uniformity of the curd cutting made possible by the inclusion of the overrunning clutch mechanism, and to the uniform heat application. The apparatus of the present invention has the further advantages of being considerably easier to clean than many presently used cheesemaking apparatus.

We claim:

1. A cheese harp comprising a peripheral frame, a plurality of guide pins secured to the side members of said frame, successive ones of said pins on each side member of said frame being disposed on opposite faces of said frame, each of said pins having a corresponding pin on the opposite side member of said frame and on the same face of said frame, and cutting wire having each end anchored and having the portion intermediate its ends arranged in a plurality of straight portions, each of said straight portions being strung across said frame with said corresponding pins acting as guides therefor, successive adjacent straight portions being parallel and disposed respectively on opposite faces of said frame.

2. A cheese harp comprising a peripheral frame, an attaching member on one side member of said frame for suspending the same generally vertically from said attaching member into a cheese vat for movement therein in a direction generally perpendicular to the plane of the frame, a plurality of guide pins secured to the side members of said frame, successive ones of said pins on each side member of said frame being disposed on opposite faces of said frame, each of said pins having a corresponding pin on the opposite side member of said frame and on the same face of the frame, and cutting wire having each end anchored and having the portion intermediate its ends arranged in a plurality of straight portions, each of said straight portions being strung across said frame with said corresponding pins acting as guides therefor, successive adjacent straight portions being parallel and disposed respectively on opposite faces of said frame, the cross section of said peripheral frame being elongated in a direction perpendicular to the plane of the frame.

References Cited in the file of this patent

UNITED STATES PATENTS

| 1,704,509 | Miller | Mar. 5, 1929 |
| 2,714,251 | Mulhall | Aug. 2, 1955 |